United States Patent [19]
Dalton

[11] Patent Number: 4,937,682
[45] Date of Patent: Jun. 26, 1990

[54] METHOD AND APPARATUS FOR PROVIDING CONTRAST/INTENSITY CONTROL IN A DOCUMENT SCANNER

[75] Inventor: Dan L. Dalton, Greeley, Colo.

[73] Assignee: Hewlett-Packard Company, Palo Alto, Calif.

[21] Appl. No.: 290,773

[22] Filed: Dec. 28, 1988

[51] Int. Cl.$^5$ .............................................. H04N 1/40
[52] U.S. Cl. ................................... 358/461; 358/447
[58] Field of Search ..................... 358/461, 163, 447; 382/50, 51

[56] References Cited

U.S. PATENT DOCUMENTS

| | | | |
|---|---|---|---|
| 4,129,853 | 12/1978 | Althauser et al. | 358/461 |
| 4,339,774 | 7/1982 | Temple | 358/461 |
| 4,636,845 | 1/1987 | Alkofer | 358/461 |
| 4,689,691 | 8/1987 | Isogai et al. | 358/461 |
| 4,695,884 | 9/1987 | Anastassiou et al. | 358/461 |
| 4,807,045 | 2/1989 | Shimano | 358/461 |

OTHER PUBLICATIONS

*IBM Journal of Research and Development*, Jan. 1987, pp. 2–15, "Digital halftoning on the IBM 4250 Printer", by Goertzel and G. Thompson.

*Primary Examiner*—Edward L. Coles, Sr.

[57] ABSTRACT

A document scanner generates an 8-bit binary word for each picture element (PEL) of a document. One of a group of 256 different binary words is thereby generated in accordance with the image/background content of each document PEL. These scan words vary in magnitude from hexadecimal "00" to "FF", representing a PEL containing only white background, or representing a PEL containing only the most dense black portion of the document's image, respectively. An intensity and/or contrast look-up table memory element, or a computation means, each having 256 addressable locations or inputs, is addressed using the scan words. Each storage location or input is addressed by one of the 256 possible document PEL words. The stored content of each storage location in the look-up table memory element, or the value that is computed by the computation means, comprises an enhanced 8-bit binary word that varies as a function of user selected image intensity and/or contrast enhancement. In this way, each document PEL scan word produces its intensity and/or contrast enhanced equivalent PEL word.

38 Claims, 4 Drawing Sheets

METHOD AND APPARATUS FOR PROVIDING CONTRAST/INTENSITY CONTROL IN A DOCUMENT SCANNER

DESCRIPTION

1. Field of the Invention

This invention relates to the field of document scanning, and more specifically to image-intensity and/or image-contrast enhancement of the electronic image signal that results from a document scanning process or apparatus.

2. Background of the Invention

The technology of document scanning relates to method and apparatus whereby the visible image(s) carried by a document is converted to an electronic signal, for use by a variety of other electronic processing means.

Typical documents comprise a black image, and/or a shades-of-grey image, on a white paper background, although within the teachings of this invention a document need not be of these specific types. More generally, the document's image may comprise colored line-text images, and/or color-scale pictorial images on a different color background substrate such as paper.

The document's visual image is converted into a digital image signal by the scanning process. This digital image signal can be used in many ways. For example, the image signal can be transmitted to remote locations for storage or for reproduction by a printer, or the image signal can be manipulated in a manner to enhance or change the image, or the image can be merged with other images.

The present invention relates to method and apparatus for manipulating or enhancing the image signal that is provided by a document scanner means. More specifically, the invention provides operator controlled image-intensity and/or image-contrast enhancement of the digital image signal that results from a document scanning process or apparatus.

In accordance with well known techniques, the scanning of a document operates to divide the document into an X-Y matrix comprising a large number of individual picture elements (PEL or PELS) equal in number to X times Y. For each document PEL, an electronic signal is generated by the scanner apparatus.

Very simplistically, if a portion of the document's black image (assuming a black image on white paper background) is detected within a document PEL, the binary signal "1" can be generated, in which case, the absence of a portion of the document's black image at the PEL location (i.e. the PEL contains the white document background) would result in a binary "0" being generated.

Usually, however, the scanner signal that is generated for each document PEL is a multi-bit digital signal. This is desirable since a multi-bit signal allows the sensing of different levels of blackness within each PEL area of the document (i.e. grey scale PEL information can be provided). Thus, a 4-bit signal per PEL allows 16 different color-shades of document image (i.e. white, 14 different shades of grey, and black) to be generated for each document PEL. The range of values of such a 4-bit signal would vary from a low value of hexadecimal "0", to a high value of "F". When an 8-bit per PEL signal is generated, the 256 different signals represent 256 different color-shades of document image for each document PEL. The range of values of such an 8-bit signal would vary from a low value of "00" to a high value of "FF".

The present invention will be described in relation to a document scanner that provides an 8-bit signal for each document PEL. The scan word "00" will represent a white PEL. The scan word "FF" will represent a dense black PEL, and intermediate value words will represent shades of grey PELS. However, as those skilled in the art will readily appreciate, the invention is of general scanner utility, and is not to be limited to this specific multi-bit scan signal format.

Two image enhancement functions that can be provided in an image scanning process are image intensity (i.e. image brightness) enhancement and image contrast enhancement. Image intensity or brightness is defined as the overall whiteness or lightness of the image, for example the overall whiteness of a black-on-white image. Image contrast is defined as the rate at which an image's color shade changes from the deepest color portion to a no-color or background color portion, for example the rate at which a black-on-white image changes from a dense black image area to an all-white image area.

An image enhancement technique of interest is described in the IBM Journal of Research and Development, January 1987, at pages 2 through 15. This publication contains an article entitled "Digital halftoning on the IBM 4250 Printer" describing the adjustment of contrast and brightness of a grey-level input image signal by the use of an input-output mapping technique. The described mapping technique makes use of an 0.8-unit-square map that is placed concentrically within a 1.0-unit-square, input-output, transformation map. The input-output mapping provided thereby comprises three regions; (1) a straight-line central region that is located entirely within the inner 0.8-unit-square map, this line being having a contrast-determined slope and a brightness-determined point that lies on the line, (2) a first parabolic curve that extends from (a) the intersection of the above mentioned straight line with the edge of the 0.8-unit-square map to (b) the 0,0 (white,white) input-output corner of the 1.0-unit-square map, and (3) a second parabolic curve that extends from (a) the intersection of the straight line with the edge of the 0.8-unit-square map to (b) the 1,1 (black,black) corner of the 1.0-unit-square map.

While brightness/contrast enhancement of the above described type is somewhat satisfactory, the present invention is more versatile, and provides more pleasing enhanced images upon printing and the like.

The present invention provides intensity/contrast control by means of a unique enhancement computation means, which may include a look-up table memory means. By way of such a computation means enhanced image PEL signals, dependent upon the specific image intensity value and/or image contrast value selected by the user, are generated. More specifically, in methods and apparatus according to the invention, enhanced image PEL signals are calculated utilizing a computation means wherein (1) a selected intensity enhancement operates to determine a point on a line that spans an input-output value matrix, and wherein (2) a selected contrast enhancement determines the slope of an input-signal/output-signal function line that extends through the value matrix and through said intensity-determined point. The present invention provides a memory map or look-up table that is addressable by each of the different input-signal document scan PEL values, to accordingly fetch an enhanced output-signal document PEL value from memory for each of these different input-signal document scan PEL values. Further, the invention provides computation means yielding a versatile combination of straight line and/or parabolic curve input-signal/output-signal function lines that change as a function of the specific intensity and/or contrast that is user-selected at any given time.

SUMMARY OF THE INVENTION

The present invention provides intensity and/or contrast enhancement of the digital scan signal that is generated by well known document scanner apparatus such as is shown in FIG. 1. Apparatus of this type generates a multi-bit binary scan word for each PEL of the document being scanned. The value of these multi-bit words can vary from a minimum value (Imin) to a maximum value (Imax). The minimum word value of all "0s", for example, represents the magnitude of light that is reflected from the document's white background PELS, whereas the maximum word value, comprising all "1s", represents the magnitude of light that is reflected from the document's most dense black image PEL areas. Intermediate word values represent shades-of-grey PEL image areas.

The invention provides a computation means 47, sometimes including a look-up table means, such as random access memory means (RAM) 40, that generates intensity and/or contrast enhanced multi-bit words in response to receiving an input scan word from the scanner's A/D converter 29. These two means have addressable inputs that are equal in number to the range of values scanned by the original scan word range of Imax-Imin. For example, when the above mentioned multi-bit scan word is a byte, these means have 256 addressable inputs.

The invention's computation means 47 accepts user defined image intensity and/or user defined image contrast 49 as control inputs. The computation means computes an enhanced multi-bit output word for each of the original scan words in the range Imax-Imin, based upon these two user defined image parameters.

The invention is best understood by considering a square, input-output value matrix 47 (see FIG. 5). This matrix is defined by an X-Y coordinate system whose X axis comprises an addressable input signal axis, and whose Y axis comprises an output signal axis. The input value Imin and the output value Omin are located at the origin of this X-Y coordinate system.

The input signal axis provides an addressable input to the value matrix, whereas the output axis defines a corresponding (i.e. stored) output signal for each of the input addresses. This corresponding output signal is based upon an input-output function line 55 that traverses the value matrix in a manner defined by the user defined image intensity 48 and image contrast 49.

The user defined image intensity control input 48 defines a point 56 on a straight line 57 that extends from the Imax value (i.e. address) on the input axis to the Omax value on the output axis. As the user changes the intensity input, point 56 moves on line 57, and specifically, when image intensity is increased, the intensity-determined point moves toward the input axis of the X-Y coordinate system (see the HIGH intensity row of FIG. 6).

The user defined image contrast input defines the slope of the input-output value function line 55 that traverses the value matrix. Line 55 also extends through the above mentioned intensity-determined point 56. The slope of input/output function line 55 becomes more nearly perpendicular to the input axis as image contrast increases (see the HIGH column of FIG. 6).

In an enhancement of the invention, computation means 47 determines that if a straight input-output function line 55 were used to generate output values corresponding to each input value, image details embodied in low and/or high values of the input scan signal would be lost (see examples 72-76 of FIG. 6). In this event, the input-output value function line can be modified to extend in a curved (i.e. parabolic) fashion, to compress, but not eliminate, such image details (see the examples of FIGS. 7b and 8).

Accordingly it is an object of the invention to provide a document scanner method and apparatus that is operable to scan a document and thereby generate an input scan word for each picture element of the document, the input scan words varying in magnitude from a low value to a high value and representing a document PEL containing image coloration of one extreme to image coloration of the opposite extreme, respectively, intensity/contrast enhancement of the input scan words being provided by computation means having an input-output coordinate system defining a rectangular value field by way of a first input scan word axis and a second orthogonal output scan word axis, the origin of the coordinate system containing the low value input scan word and the low value output scan word, the coordinate system including an intensity-line that connects the high value input scan word to the high value output scan word, wherein a point on the intensity-line is determined in accordance with a desired image intensity, and wherein an input-output function line extends through this point and through the value field at a slope that is determined by the desired image contrast.

It is a further object of the invention to provide a computation means that determines that if a straight input-output function line were to be used with a given set of image intensity and contrast, then image detail would be lost at low and/or at high values of input scan words, whereupon the input-output function line is modified to compress the detail contained in such low and/or at high values of input scan words.

These and other objects and advantages of the invention will be apparent to those of skill in the art upon reference to the following detailed description wherein reference is made to the drawing.

DETAILED DESCRIPTION OF THE INVENTION

Figure 1:
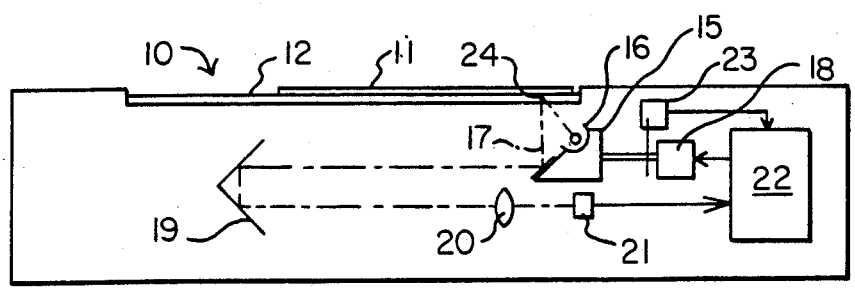
FIG. 1 is a showing of a representative document scanner in which the invention finds utility.
Figure 2:
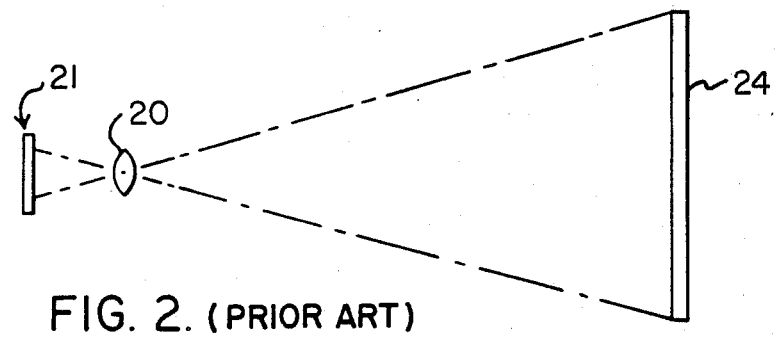
FIG. 2 shows the object-plane/image-plane optical path of the FIG. 1 scanner in its unfolded state.
Figure 3:
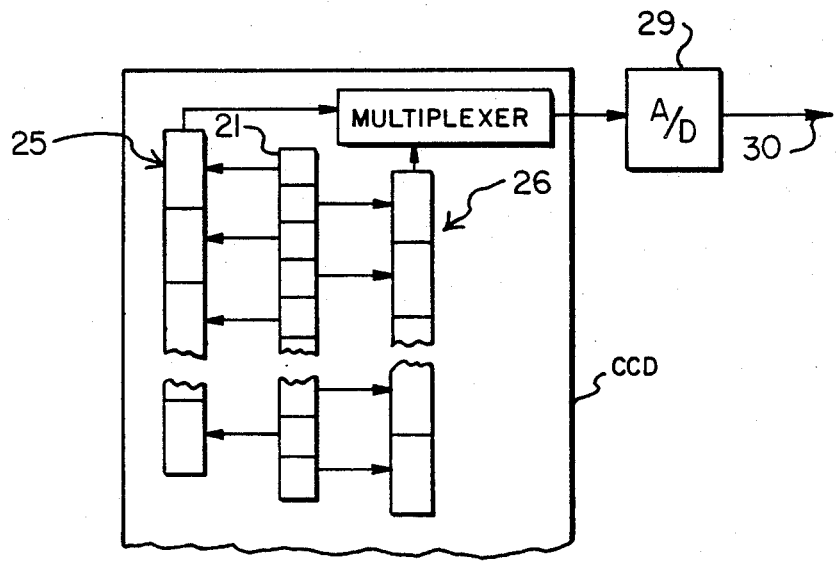
FIG. 3 shows the manner in which the analog output of the individual sensor cells of FIG. 1 are converted to a digital signal.

A typical document scanning machine environment for implementing the present invention is shown in FIGS. 1-3 in the form of a scanner 10. This scanner is of the general type in which the present invention finds utility. However, the invention is not to be limited thereto.

In this exemplary scanner, document 11 is positioned with its visual image facing downward on transparent platen 12. The image is then scanned, so as to convert the visual image contained thereon into an electronic signal image form that is useable by data processing machines and the like.

The scanning process is accomplished by a movable carriage 15 which contains a linear light source 16 and a reflecting mirror 17. Motor 18 is mechanically coupled to carriage 15 as by gears, cables or the like, to move carriage 15 along the length of platen 12. The light reflected from the document image is redirected by movable corner mirror 19 into lens 20 and thence into sensor 21. As is well known in the art, mirror 19 is mounted for movement concurrently with carriage 15, but at one half the velocity of carriage 15, so that the optical path from the object plane of scan line 24 to the image plane of sensor 21 is maintained constant in length.

Sensor 21, without limitation thereto, is preferably a charge coupled device (CCD) that is configured as a linear serial array of discrete light detector cells. Each detector cell of sensor 21 defines a document picture element (PEL). For instance, CCD's which can distinguish 300 of these PEL cells per inch on the document provide good quality resolution, and are readily available from contemporary commercial sources.

In FIG. 2, the typical 8.5 inch long image scan line 24 (also note numeral 24 in FIG. 1) is optically reduced in length as it passes through lens 20 in a ratio of 7.7:1 before reaching CCD detector array 21. The analog electrical signal content of sensor 21 is periodically read out, document line by document line, as carriage 15 moves along the length of document 11 on platen 12. Thus, if sensor 21 is configured with 2310 sensors per inch, it is possible, with appropriate controls, to record image densities of 300×300 detected PELS per square inch from the document.

The output scan signals from sensor 21 are coupled to electronic controller 22, where the signals are converted to digital signals, as described below in conjunction with FIG. 3. Controller 22 introduces drive signals to motor 18, and may also receive position or movement feedback information relative to carriage 15 and/or mirror 19, such as from the output of a tachometer position detector 23.

FIG. 3 illustrates one arrangement for reading out the analog signal content of sensor 21. By means of gating signal controls (not shown), the analog signal content of every other detector cell of sensor 21 is coupled in parallel into analog shift register 25, while the signals present in the other intervening detector cells are coupled in parallel into analog shift register 26. That is, in the example shown, the contents of the odd numbered cells of sensor 21 are periodically transferred to shift register 25, whereas the even numbered cells have their contents transferred to shift register 26 at the same periodic time.

The analog signals that are loaded into shift registers 25 and 26 are representative in magnitude of the various light levels that are reflected from the individual PELS of document 11. The magnitude of these analog signals corresponds to the average of the light that is reflected from a small incremental surface area or PEL of document 11 over a predetermined period of time. Subsequent to transfer into registers 25 and 26, these analog signals are shifted serially into an analog to digital converter (A/D) 29. A variety of appropriate analog to digital converters are commercially available for this purpose. The output 30 of A/D 29 is a sequence of multi-bit digital data, for example one byte of data for each document PEL. Each of those data bytes is encoded so as to correspond digitally to the magnitude of a discrete one of the analog signals that is retrieved from shift registers 25 and 26, and thus each byte corresponds to the magnitude of the reflected light present at one of the document PELS. That is, if array 21 images 300 cells or PELS per inch, output 30 of A/D 29 comprises a similar 300 bytes per inch.

Figure 4:
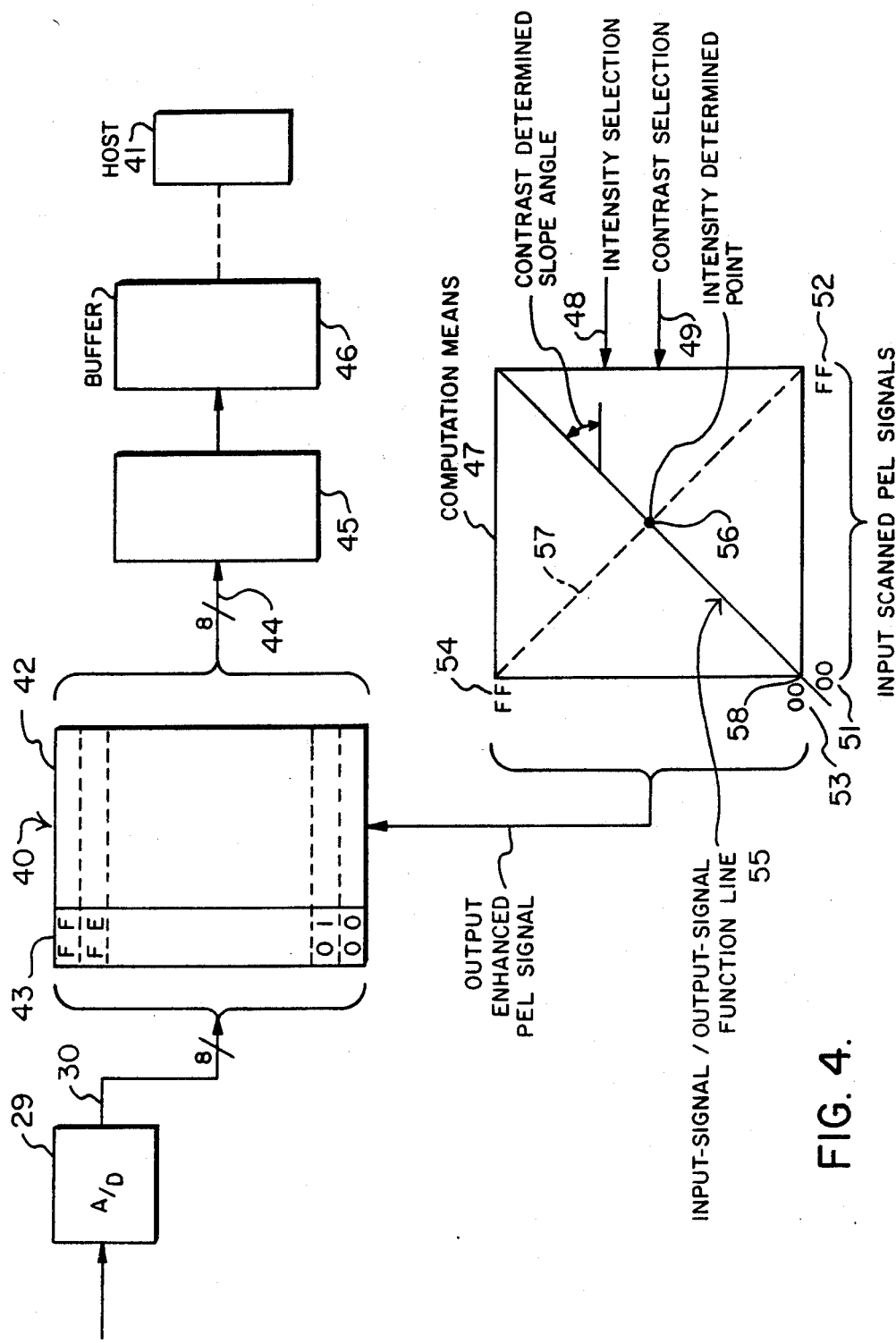
FIG. 4 is a showing of the invention as it is incorporated into an electronic circuit means that operates to accept the digital image signal scan output from the A/D convertor of FIG. 3, enhance the intensity and/or contrast of the signal, and then apply the signal to a host computer system.

FIG. 4 shows the PEL word output 30 of FIG. 3's A/D convertor 29 connected to the addressing means 43 of a look-up table or tone map memory means 40 in accordance with the present invention. It will be appreciated by those skilled in the art that the showing of FIG. 4 is but a simplified showing, and that other well known circuit means are usually found in such a system that connects the output of sensor array 21 (FIG. 1) to a utilization device such as host computer system 41.

Memory means 40 is shown as having a storage section 42 that contains 256 storage locations, i.e. locations having addresses hexadecimal "00" through "FF". Storage section 42 is addressed by address section 43. Address section 43 is connected to receive the 8-bit output 30 from A/D convertor 29. Thus, the document PEL scan word "00", for example, that is received from A/D convertor 29 addresses the "00" storage location of memory section 42, and the enhanced PEL word that is stored at that memory location is presented to the output bus 44 of memory means 40.

While the invention finds utility in the intensity and/or contrast enhancement of any multi-bit per PEL image signal that is supplied by bus 30, the invention will be described relative the enhancement of an 8-bit per PEL signal. The invention operates to supply an intensity and/or contrast enhanced 8-bit per PEL signal on output bus 44, as will be described. As those skilled in the art will appreciate, the scope and content of the invention is not to be limited to this specific 8-bit input-/output signal format.

The enhanced 8-bit signal on bus 44 can be sent or connected to a variety of electronic signal utilization means. In FIG. 4, bus 44 is connected to an exemplary means 45 whereat other functions, such as image scaling, dithering, thresholding, windowing and/or packing can be provided, as desired. The resulting signal is then buffered at 46, in preparation for transmission to host computer system 41, for example.

In accordance with a feature of the present invention, the image intensity enhancement and/or image contrast enhancement of the multi-bit per PEL signal on bus 30, by operation of the method and apparatus of the invention, takes place prior to other signal modification functions such as a dither function that may be provided by means 45.

In accordance with the invention, the enhanced PEL words that are stored in storage section 42 are computed by computation means 47 in accordance with the user's image intensity selection at 48 and/or the user's image contrast selection at 49. As will be described in greater detail, computation means 47 comprises and implements an algorithm means that references an X-Y coordinate input/output value matrix having an origin 58. The X axis of this coordinate system contains all possible scan input PEL values, in this case ranging from "00" at 51 to "FF" at 52. The Y axis of this coordinate system contains all possible enhanced output PEL values, in this case ranging from "00" at 53 to "FF" at 54.

The enhanced PEL value that is stored at a particular address location in storage section 42 is found by projecting that address value scan PEL up to an intersection with the input/output function line 55 of computation means 47, and then projecting this intersection point horizontally onto the Y axis, to find the value of the enhanced output PEL word to be stored at that address location in storage section 42.

In FIG. 4, the particular input/output function line 55 that is disclosed is, for example, a default function line that results when the user does not make a specific intensity selection 48 or a specific contrast selection 49. Note that in this case, the enhanced output PEL word that is accessed by an address scan PEL word 30 is equal in value to the value of that scan PEL word. This is true because intensity-determined point 56 is located in the middle of the value coordinate system, and the contrast-determined slope of input/output function line 55 is 45 degrees.

In accordance with the invention, and as will be described in greater detail, the selection of an image intensity different from the default intensity shown in FIG. 4 causes point 56 to move along a computation means diagonal line 57, which line connects the "FF" input value point on the X axis to the "FF" output value point on the Y axis. More specifically, increasing image intensity causes point 56 to move downward on line 57 (see the HIGH row of FIG. 6). Also, the selection of an image contrast different from the default contrast shown in FIG. 4 causes the slope of input/output function line 55 to change. More specifically, increasing image contrast causes the input/output function line 55 to become more vertical (see the HIGH column of FIG. 6).

FIG. 4 shows an embodiment of the invention that can be called an off-line system in that prior to scanning of the document, the user's selection of intensity and contrast has resulted in the loading of storage section 42 with an enhanced output PEL word for each of the possible scan PEL words that will later be supplied to address section 43 during or after scanning.

It is within the scope and content of the invention to provide an on-line system wherein, during scanning, the serial stream of scan PEL words are supplied to the input of computation means 47, and the resulting enhanced output of the computation means is dynamically supplied to a utilization such as means 45.

Also, those skilled in the art may elect to implement embodiments of the invention by scanning a document, storing the resulting scan PELS in memory, and then later replaying the scan PELS to a utilization means, as is desired, using the memory means 40 and/or the computation means 47, or their equivalent.

The present invention is implemented in the preferred embodiment by input-output tone map, translation table, or look-up table memory means 40 and/or by a computation means 47.

In a generic sense, memory means 40 and computation means 47 are each input-signal (i.e. address-input) to output-signal translation means. Each input scan PEL signal that is presented to memory means 40 or to translation means 47 comprises the information content of a scanned document PEL. Each input scan PEL signal operates to address a unique memory location within means 40, and/or operates to generate a unique enhanced PEL output signal, based upon the unique magnitude of the input scan PEL signal As a result of this addressing of means 40 or means 47, an enhanced PEL output signal is supplied to a utilization means 45 as an intensity/contrast enhanced output signal that corresponds to each input scan signal In the case of an off-line system, the enhanced PEL signal is stored at the addressed location of the memory's storage section 42. In the case of an on-line system, the enhanced PEL signal is generated by the input-output signal function 55 of computation means 47.

Storage section 42 is preferably a random access memory device (RAM) in which a unique output PEL value is stored for each and every possible input PEL value. The output PEL signal values that are loaded in section 42 are generated by computation means 47, for example by the execution of a computer program. Computation means 47 generates the output PEL signal values that are stored in storage section 42, based upon (1) the user-selected image intensity 48 which defines a point 56 on the diagonal line 57 of the X-Y value matrix, and (2) the user-selected image contrast 49 which defines the slope of the input-output function line 55 that extends through point 56. This input-output function line defines all of the unique output PEL signal values that are available for each of the possible scan PEL values, for a particular intensity and/or contrast enhancement.

Figure 5:
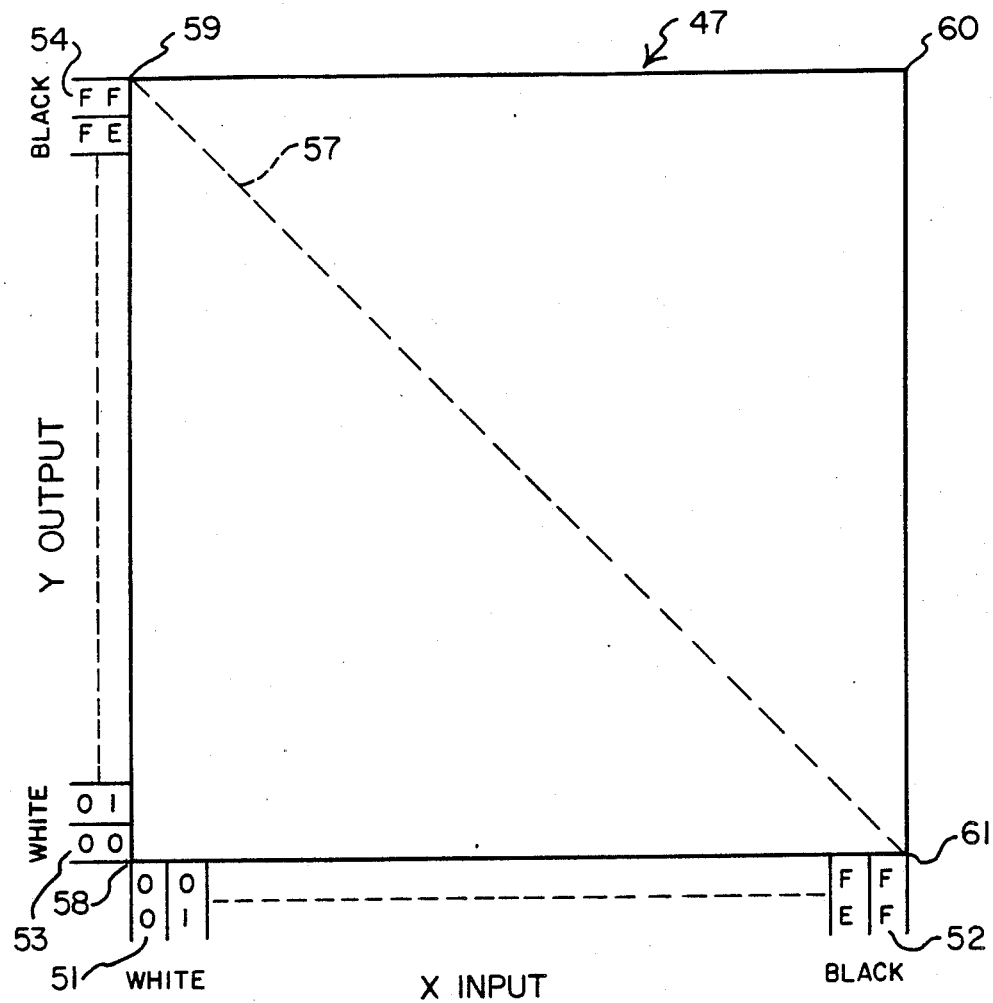
FIG. 5 is a showing of the computation means input-output value matrix that is controlled by user selection of image-intensity and/or image-contrast enhancement, FIG. 6 show a number of exemplary input-output signal translation functions that may be generated as the user selects image intensity and image contrast that vary from minimum, to normal, to maximum.

FIG. 5 shows the value matrix of computation means 47 of FIG. 4 in greater detail. In this showing, the X input axis and the Y output axis coordinates of the value matrix identify the four corners 58–61 of the value matrix. For purposes of explanation, and without limitation to the scope and content of the invention, corner 58 will be called the "input-minimum, output-minimum", or "Imin-Omin", corner of the matrix. As shown in FIG. 5, map corner 58 can also be identified as the "00-00" corner, or the "white-white" corner, and corner 59 can be called the "white-black" corner, while corner 60 can be called the "black-black" corner. Using this above defined convention, corner 59 of the value matrix is the "Imin-Omax" corner, corner 60 is the "Imax-Omax" corner of the matrix, and corner 61 is the "Imax-Omin" corner of the matrix.

In the specific embodiment being described, where an 8-bit per PEL input scan signal on bus 30 is enhanced by operation of the invention, an "Imin" signal 30 comprises the hexadecimal byte "00", representing a white document PEL. As will be apparent, the corresponding enhanced output PEL on bus 44 need not always be "00", and more specifically the content of the output byte varies as a function of the user selected image intensity and image contrast.

In this same embodiment, when the input scan signal on bus 30 is equal to "Imax", the Hexadecimal byte "FF". is present on bus 30. The byte "FF" represents, for example, a dense black image color. As will be apparent, the corresponding enhanced output byte on bus 44 need not always be "11", and more specifically the content of the corresponding output byte also varies as a function of the user selected intensity and contrast.

The computational straight diagonal line 57 of the FIG. 5 value matrix, upon which the user-selected intensity point 56 is always located, terminates at the Imax or "FF" corner 61 and at the Omax or "FF" corner 59 of the matrix.

The input-output function line 55 that is shown in FIG. 4 is an exemplary default function line that is used in the absence of an image intensity and/or image contrast selection by the user. As can be seen, this default condition yields an enhanced output byte that is identical in value to the input scan byte.

As stated, the matrix's intensity-determined point 56 is always located on computation line 57. The image contrast is the slope of the input-output function line 55 that always extends through point 56. Note that the exemplary default line 55 of FIG. 4 passes through the map's Imin-Omin and Imax-Omax corners 51 and 60.

As those skilled in the art will appreciate, the input-output matrix 47 of the invention can be implemented in a number of different ways, all of which are to be considered as being within the spirit and scope of the invention. For example, a microprocessor (not shown) can be provided to accept the user selected image intensity 48 and/or image contrast values 49 as inputs. This processor accepts these inputs, and uses the input scan values in the range Imin-Imax to calculate a corresponding output value in the range Omin-Omax for each and every possible value of the scan signal. For example, an output signal byte is calculated and stored in storage section 42 for each and every possible byte of input signal that may be provided by bus 30 during document scanning operation. In the above example the input bytes range in value from "00" to "FF". The corresponding calculated input-output translation bytes are loaded into storage section 42 at addressable locations "00" to "FF", which locations are addressed by the corresponding input byte. As a result, the output byte that is accessed from storage section 42 for each of the possible input bytes equals the calculated intensity/contrast enhanced translation for the input bytes.

Again with reference to FIG. 5, when the user selects a specific value of image intensity 48, intensity-determined point 56 moves along line 57. The mid point of this line indicates no change in image intensity from the input to the output of the computation means. When the user selects a specific value of image contrast, the input-output function line 55 pivots about the position of point 56 on line 57. Function line 55 can vary from nearly horizontal to nearly vertical, depending upon the contrast selection. Generally speaking, as the selected image intensity or brightness increases, point 56 moves downward on line 57, that is the output image becomes more white, i.e. point 56 moves toward the Omin value; and, as the selected image contrast increases, the input-output function line 55 pivots about intensity-determined point 56 to become more nearly vertical.

Figure 6:
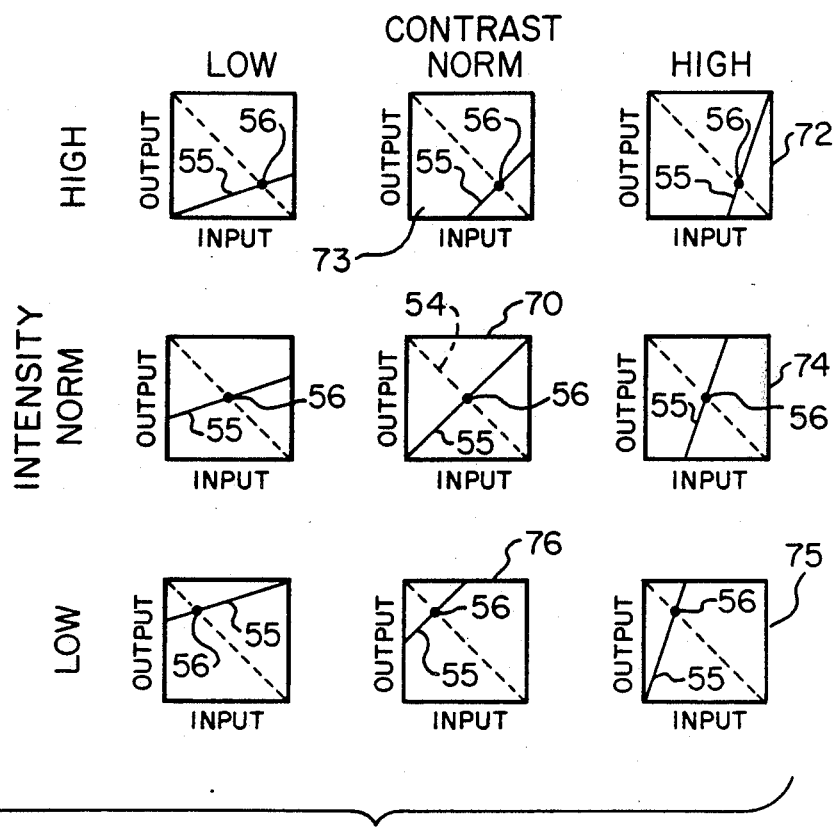

These characteristics of the invention are shown in FIG. 6, where the "normal intensity" and "normal contrast" expression 70 of value matrix 47 is seen to be identical to the showing of FIG. 4.

An enhancement to the above defined invention is provided by an input-output function line 55 that is not always the straight line that is shown in all of the examples of FIG. 6. In this enhancement of the invention function line 55 retains the above described intensity-determined point 56, and the slope of function line 55 at this point 56 remains as described, i.e. the slope is determined by the user selection of contrast. However, function line 55 may deviate from a straight line, to intercept the matrix's Imin-Omin corner 58 and/or the matrix's Imax-Omax corner 60 by way of a curved line that extends from point 56 to the corner(s), for example by way of a parabolic function line 71 of FIG. 7B that extends from point 56 to the corners 58 and 60, or by way of parabolic function line 83 that extends from point 56 to corner 58 in FIG. 8.

More specifically, when the map's input-output translation function 55, when considered as a straight line function, would intersect either or both of the matrix's upper or lower boundaries that define the input image signal (see the matrix examples 72, 73, 74, 75 and 76 of FIG. 6), such that detail would be lost in a value range Imin-Imax of the input image, the input-output function line that will be implemented by this enhancement to the invention is redefined so as to eliminate this loss of input image detail.

Figure 7A:
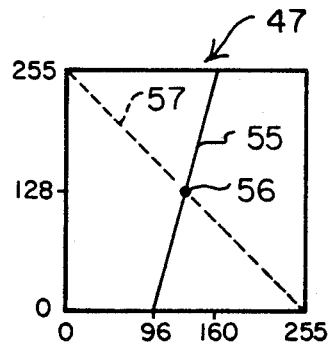
FIGS. 7a and 7b are used to explain an enhancement of the invention where the input-output signal translation function is modified to incorporate two parabolic portions.

FIG. 7a is an example of the loss of image detail. This figure shows a computation value matrix 47 having a signal translation function 55 similar to that shown in matrix example 74 of FIG. 6. In this situation, the user has selected a high (i.e. HIGH) image contrast, but has elected to use normal (i.e. NORM) image intensity.

Note from FIG. 7a that all input scan PELS whose byte values are between decimal 0 and decimal 96 yield the same output PEL value of decimal 0. Also, all input scan PELS whose byte values lie between decimal 160 and decimal 255 yield the same output PEL value of decimal 255. As a result, all input document information that is contained in document PELS having these signal magnitude ranges will be lost.

Figure 7B:
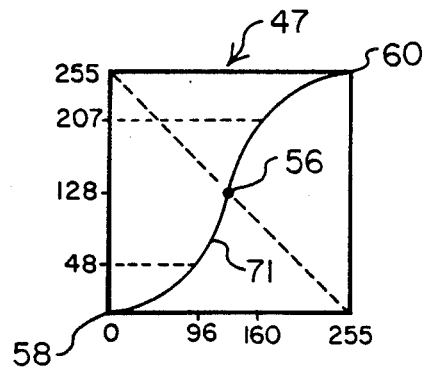

When this result is undesirable, the input/output value user may elect to implement the use of an enhancement matrix, and to generate output values in accordance with a matrix such as is shown in FIG. 7b.

In FIG. 7b, the same intensity-determined point 56 is used. However, in this case the input-output function line 71 that passes through point 56 is of the contrast-determined slope only at point 56, and has a curved (i.e. parabolic) shape from point 56 to both of the corners 58 and 60 of value matrix 47. In this case, the input document PELS whose byte value are between decimal 0 and decimal 96 are compressed to yield output byte values in the range of from decimal 0 to decimal 48; and input document PELS whose byte values are between decimal 160 and decimal 255 are compressed to yield output byte values between decimal 207 and decimal 255. As a result, the document detail information that is contained in these scan PEL value ranges are compressed, but the detail is not lost.

The FIG. 7b example pertains to a situation where input image detail would be lost at both low input PEL values and at high input PEL values, i.e. in the 0-96 value range and in the 160-255 value range, as above described. In the situation where input image detail would be lost at only one end of the input PEL value range, i.e. matrix examples 72, 73, 75 and 76 of FIG. 6, it is preferable that the enhancement algorithm of the invention provide a curved function line only in relation to the end of the input range at which the document scan information would be lost, should a straight line input-output function be implemented.

Figure 8:
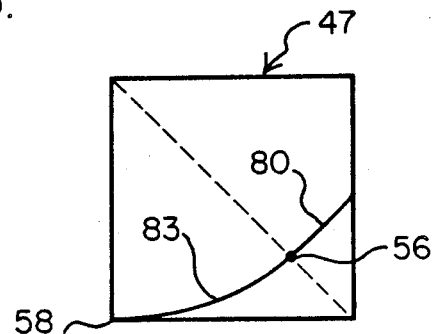
FIG. 8 is used to explain an enhancement of the invention that is similar to FIGS. 7a and 7b, where the input-output signal translation function is modified to incorporate one parabolic portion.

FIG. 8 shows an example of a computation value matrix 47 such as is shown at 73 in FIG. 6. Note that when a straight input-output translation function line is implemented in this example, input image detail is lost for low value scan PELS. When the user wishes to retain these low magnitude input image details, the matrix of FIG. 8 is implemented. In this matrix the input-output function line 55 retains the straight line portion 80, having the above mentioned contrast-determined slope. However, the function line of the FIG. 8 computation matrix 47 incorporates a curved or parabolic portion 83 that extends from intensity-determined point 56 to the Imin-Omin corner 58 of the matrix. In this way the low magnitude input PEL values are compressed, but they are not lost.

In a similar manner, the concept of FIG. 8 can be extended to matrix examples such as 72, 75 and 76 of FIG. 6.

As previously discussed, computation means 47 may be implemented by a processor that executes a program to generate input-output function line 55, based upon selected image intensity enhancement 48 and image contrast enhancement 49. An exemplary algorithm for program expression and processor execution will now be described. Note that the following description assumes that Imin equals zero.

In this description
(1) The term "X" equals the value of an input axis input scan word,
(2) the term "Y" equals the value of the corresponding output axis output scan word,
(3) the term "X-target" equals the input scan word value that is determined by the location of intensity point 56 on line 57,
(4) the term "Y-target" equals the output word value that is determined by the location of intensity point 56 on line 57,
(5) the term "Slope" is the SINE of the angle between the straight input-output function line 55 (as defined by the contrast selection) and the input axis,
(6) the term "Y-intercept" equals the output word value (i.e. the "Y" value) of the straight input-output function line 55 for the condition where the input scan word is at its minimum value (i.e. the "X" value is at its minimum value).

With these terms as above defined the following equations can be used to generate the appropriate straight or curved function line.
(1) "Y-intercept"="Y-target"−("Slope" * "X-target")
(2) If "Y-intercept">=0 then "Y"="Y-target"−("-Slope" * "X") for 0 <= "X" <= "X-target"
(3) If "Y-intercept"<0 then
  (a) "N"=("X-target" / "Y-target") * "Slope"
  (b) "A"="Y-target" / ("X-target"$^N$)
  (c) "Y"="A" * ("X"$^N$) for 0 <= "X" <= "X-target"

The above equations may also be used to generate the output "Y" values which correspond to the input "X" values which are greater than "X-target." One way to accomplish this is by temporarily rotating the computation value matrix 180 degrees such that the Imax-Omax corner 60 becomes the Imin-Omin corner 58 for the purpose of computing the input-output function line segment between the new Imin-Omin corner and intensity point 56 on line 57. Another way would be to generate a second set of equations which are customized for the right side of the matrix.

When input scan word information would be lost at low and/or high "X" values, as a result of intersection with the lower or upper boundaries of the computation value matrix by the input-output function line, respectively, the input-output function line is changed by the above equations to provide intersection of matrix corners 58 and/or 60 by a parabolic portion(s) of the function line.

The above detailed description of preferred embodiments of the invention will enable those skilled in the art to envision yet other embodiments of the invention. Thus, this detailed description should not be considered as a limitation on the scope, spirit and content of the invention.

What is claimed is:

1. A method of enhancing digital image signals that are provided by a document scanner as a document is scanned, said document comprising a matrix of picture elements (PEL), wherein each PEL of said scanned document is represented by a multi-bit input signal word whose magnitude represents light intensity reflected from a document PEL during scanning of said document, each such input signal word being capable of varying in magnitude from a minimum value (Imin) to a maximum value (Imax), the method operating to provide corresponding enhanced output signal words varying in magnitude from a minimum value (Omin) to a maximum value (Omax), the method comprising the steps of,
 providing computational means having a rectangular computational signal value field, said signal value field having
  an input axis that is addressable in a range of Imin to Imax value locations,
  an orthogonal output axis that provides corresponding enhanced output signal values in a range of Omin to Omax value locations, and
  an image parameter line that extends from said Omax value location on said output axis to said Imax value location on said input axis,
 defining a point on said image parameter line as a function of a first user-defined image parameter,
 defining an input-output function line within said computational value field as a function of a second user-defined image parameter, said input-output function line extending through said point and having a slope that is determined by said second image parameter,
 addressing said input axis of said computational value field using said input signal words, and
 providing output signal words from said output axis, as is defined by said input-output function line and by said addressing input signal words, to output signal word utilization means.

2. The method of claim 1 wherein said first image parameter is image intensity and wherein said second image parameter is image contrast.

3. The method of claim 2 wherein said ranges Imin-Imax and Omin-Omax are equal magnitude ranges.

4. The method of claim 3 wherein said point on said computation line is located about mid-line to define no change in image intensity from input to output, and wherein said point moves toward said input axis as the output intensity is increased.

5. The method of claim 4 wherein said input-output function line extends at a slope of about 45 degrees to said input axis to define no change in image contrast from input to output, and wherein the said input-output function line extends more nearly perpendicular to said input axis as the output contrast is increased.

6. The method of claim 1 wherein said computational means includes memory means having a plurality of individual storage locations each of which are capable of storing an enhanced output signal word, and including the steps of
- loading individual storage locations of said memory means with values of said output signal words in the range Omin to Omax, corresponding to input signal words in the range Imin to Imax,
- using said input signal words to address said memory means, to thereby access corresponding enhanced output signal words, and
- providing said accessed enhanced output signal words to utilization means.

7. The method of claim 6 wherein said ranges Imin-Imax and Omin-Omax are equal magnitude ranges.

8. The method of claim 7 wherein said first image parameter is image intensity and wherein said second image parameter is image contrast.

9. The method of claim 8 wherein said point on said computation line is located about mid-line to define no change in image intensity from input to output, and wherein said point moves toward said input axis as the output intensity is increased.

10. The method of claim 9 wherein said input-output function line extends at a slope of about 45 degrees to said input axis to define no change in image contrast from input to output, and wherein the said input-output function line extends more nearly perpendicular to said input axis as the output contrast is increased.

11. The method of claim 1 including the steps of
- determining user-defined image parameters that cause said input-output function line to intersect (1) said input axis, and/or (2) an axis that is parallel thereto and contains the value range Imin-Imax, and the Imin value of which is coincident with the Omax value of said output axis, and
- upon making such a determination, implementing a curved input-output function within said value field that extends from said point to the input-axis-/output-axis origin of said rectangular value field, and/or to the Imax value point on said parallel axis, respectively.

12. The method of claim 11 wherein the curved portion or portions of said input-output function line comprise a parabolic curved portion.

13. The method of claim 6 including the steps of
- determining user-defined image parameters that cause said input-output function line to intersect said input axis, and/or an axis that is parallel thereto and contains the value range Imin-Imax, and the Imin value of which intersects said output axis at its Omax value, and
- upon making such a determination, implementing a curved input-output function within said value field that extends from said point to the input-axis-/output-axis origin of said rectangular value field, and/or to the Imax value point on said parallel axis, respectively.

14. The method of claim 13 wherein the curved portion or portions of said input-output function line comprise a parabolic curved portion.

15. In a document scanner operable to scan a document and to generate an X-bit input scan word for each picture element of the document, said input scan words comprising Y different binary words that vary in magnitude and ranging from a low value to a high value, representing a document PEL containing image coloration of one extreme to image coloration of the opposite extreme, respectively, apparatus for providing intensity/contrast enhancement of said input scan words, comprising,
- first control means enabling user selection of image intensity enhancement,
- second control means enabling user selection of image contrast enhancement,
- computation means having an input-output scan word value coordinate system that defines a rectangular input-output value field,
- said coordinate system being defined by an input scan word value axis and an orthogonal output scan word value axis,
- the origin of said coordinate system containing the low value of the input scan word range of values and the low value of an output scan word range of values, and
- an intensity-point-line that connects the high value of said input scan word range of values to the high value of said output scan word range of values,
- said computation means responding to said first control means to establish a point on said intensity-point-line in accordance with user selection of image intensity,
- said computation means responding to said second control means to provide an input-output function line that contains said point and that extends through said value field at a slope determined by user selection of image contrast, and
- said computation means operating to project a received input scan word value from said input axis onto said input-output function line and then onto said output axis to determine an enhanced output scan word value for each received input scan word value,
- output scan word utilization means, and
- means connecting said enhanced output scan words to said utilization means.

16. The apparatus of claim 15 wherein said image coloration of one extreme comprises the white background of a color-on-white document, and wherein said image coloration of the opposite extreme comprises the most densely colored portion of the image that may be carried by said color-on-white document.

17. The apparatus of claim 16 wherein X is equal to 8, and wherein Y is equal to 256.

18. The apparatus of claim 17 wherein said low value of said input scan word and of said output scan word comprises an all 0's binary word, and wherein said high value of said input scan word and of said output scan word comprises an all 1's binary word.

19. The apparatus of claim 15 including,
- look-up table memory means having Y storage locations, each storage location being addressable by a different individual one of said input scan words,
- means for loading the determined enhanced output scan word for each of said input scan words into corresponding storage locations of said memory means, and means providing said input scan words as addresses to said memory means, such that the storage location content of said memory means, as is addressed by its corresponding input scan word causes a corresponding enhanced output scan word to be fetched from said memory means.

20. The apparatus of claim 19 wherein said image coloration of one extreme comprises the white background of a color-on-white document, and wherein said image coloration of the opposite extreme comprises the most densely colored portion of the image that may be carried by said color-on-white document.

21. The method of claim 20 wherein X is equal to 8, and wherein Y is equal to 256.

22. The apparatus of claim 21 wherein said low value of said input scan word and of said output scan word comprises an all 0's binary word, and wherein said high value of said input scan word and of said output scan word comprises an all 1's binary word.

23. The apparatus of claim 15 wherein said computation means including means for determining user-selected intensity enhancement and/or contrast enhancement that cause said input-output function line to intersect (1) said input value axis, and/or (2) an axis that is parallel thereto and contains said input scan word range of values, and the low value of said input scan word range of values being coincident with the high value of said output scan word range of values, and upon making such a determination, means for implementing a curved input-output function line within said input-output value field is rendered operative, said curved function line containing a portion or portions that extend from said point to the low value of said input scan word range of values on said input axis, and /or to the high value of said output scan word range of values on said parallel axis.

24. The apparatus of claim 23 wherein the curved portion or portions of said input-output function line comprise a parabolic curved portion.

25. The apparatus of claim 19 wherein said computation means includes means for determining user-selected intensity enhancement and/or contrast enhancement that cause said input-output function line to intersect (1) said input value axis, and/or (2) an axis that is parallel thereto and contains said input scan word range of values, and the low value of said input scan word range of values being coincident with the high value of said output scan word range of values, and means for detecting that such a user-selected intensity enhancement and/or contrast enhancement has been made, whereupon a curved input-output function line is implemented within said input-output value field, said curved function line containing a portion or portions that extend from said point to the low value of said input scan word range of values on said input axis, and /or to the high value of said output scan word range of values on said parallel axis.

26. The apparatus of claim 25 wherein the curved portion or portions of said input-output function line comprise a parabolic curved portion.

27. In a document scanner operable to scan a document and to generate an X-bit input scan word for each picture element of the document, said input scan words comprising Y different binary words that vary in magnitude and ranging from a low value to a high value, representing a document PEL containing image coloration of one extreme to image coloration of the opposite extreme, respectively, a method for providing intensity/contrast enhancement of said input scan words, comprising the steps of, providing means for enabling user selection of image intensity and/or image contrast enhancement, providing computation means having an input-output coordinate system that defines a rectangular value field, said coordinate system being defined by a first input scan word axis and a second orthogonal output scan word axis, the origin of said coordinate system containing the low value of the input scan word range of values and the low value of an output scan word value range, and an image-intensity-line that connects the high value of said input scan word range of values and the high value of said output scan word range of values, determining a point on said image-intensity-line in accordance with said user selection of image intensity, providing an input-output function line that extends through said value field at a slope that is determined by said user selection of image contrast and that contains said point, projecting received input scan words from said first axis onto said input-output function line and then to said second axis, to determine an enhanced output scan word for each of said Y input scan words, and providing said enhanced output scan words to utilization means.

28. The method of claim 27 wherein said image coloration of one extreme comprises the white background of a color-on-white document, and wherein said image coloration of the opposite extreme comprises the most densely colored portion of the image that is carried by said color-on-white document.

29. The method of claim 28 wherein X is equal to 8, and wherein Y is equal to 256.

30. The method of claim 29 wherein said low value of said input scan word word and of said output scan word comprises an all 0's binary word, and wherein said a high value of said input scan word comprises and of said output scan word comprises an all 1's binary word.

31. The method of claim 27 including the steps of, providing look-up table memory means having Y storage locations, each storage location being addressable by a different individual one of said input scan words, loading said determined enhanced output scan words for each of said input scan words into corresponding storage locations of said memory means, one enhanced output scan word corresponding to each of said input scan words, and using said input scan words to address said memory means, such that the storage location of said memory means that is addressed by its corresponding input scan word causes a corresponding enhanced output scan word to be fetched from said memory means.

32. The method of claim 31 wherein said image coloration of one extreme comprises the white background of a color-on-white document, and wherein said image coloration of the opposite extreme comprises the most densely colored portion of the image that is carried by said color-on-white document.

33. The method of claim 32 wherein X is equal to 8, and wherein Y is equal to 256.

34. The method of claim 33 wherein said low value of said input scan word word and of said output scan word comprises an all 0's binary word, and wherein said a high value of said input scan word comprises and of said output scan word comprises an all 1's binary word.

35. The method of claim 27 including the steps of
determining user-selected image enhancement that cause said input-output function line to intersect (1) said input axis, and/or (2) an axis that is parallel thereto and contains the same range of values, and the low value of which is coincident with the high value of said output axis, and
upon making such a determination, implementing a curved input-output function within said value field that extends from said point to the input-axis-/output-axis origin of said rectangular value field, and/or to the high value-point on said parallel axis, respectively.

36. The method of claim 35 wherein the curved portion or portions of said input-output function line comprise a parabolic curved portion.

37. The method of claim 31 including the steps of
determining user-selected intensity and/or contrast enhancement that cause said input-output word value function line to intersect (1) said input scan axis, and/or (2) an axis that is parallel thereto and contains the same range of word values, and the low word value of which is coincident with the high word value of said output axis, and
upon making such a determination, implementing a curved input-output function within said word value field that extends from said point to the input-axis/output-axis origin of said rectangular word value field, and/or to the high word value point on said parallel axis, respectively.

38. The method of claim 37 wherein the curved portion or portions of said input-output function line comprise a parabolic curved portion.

* * * * *